Figure 1:
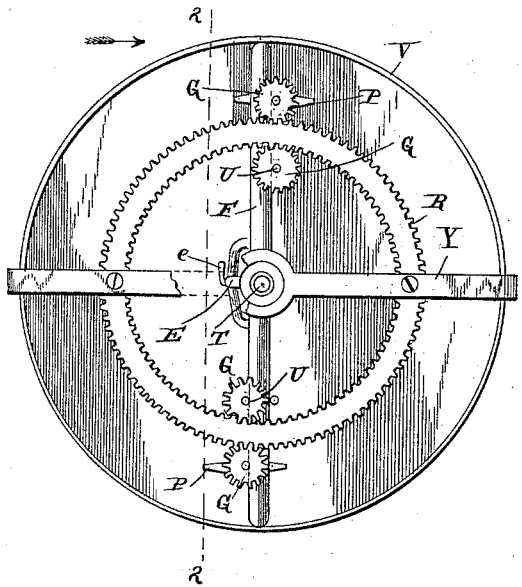

(No Model.)

D. H. McCOY.
STIRRING MACHINE.

No. 452,973. Patented May 26, 1891.

Witnesses
Geo. E. Frech.
N. T. Collamer.

Inventor
Daniel H. McCoy
By his Attorneys,
C. A. Snow & Co.

UNITED STATES PATENT OFFICE.

DANIEL HENRY McCOY, OF DARBY, PENNSYLVANIA.

STIRRING-MACHINE.

SPECIFICATION forming part of Letters Patent No. 452,973, dated May 26, 1891.

Application filed November 24, 1890. Serial No. 372,486. (No model.)

*To all whom it may concern:*

Be it known that I, DANIEL HENRY McCOY, a citizen of the United States, residing at Darby, in the county of Delaware and State of Pennsylvania, have invented a new and useful Stirring-Machine, of which the following is a specification.

This invention relates to machines for stirring catsup, apple and fruit butters, lard, maple-sugar, ice-cream during its cooking, scrapple, and other substances which require agitation while they are being heated or cooked, in order that the material will not stick to the sides of the vessel, and that it will be thoroughly and properly disintegrated and cooked.

The object of the invention is to effect improvements upon machines of this character to which end the invention consists of the details of construction hereinafter more fully described and claimed, and as illustrated in the drawings, in which—

Figure 2:
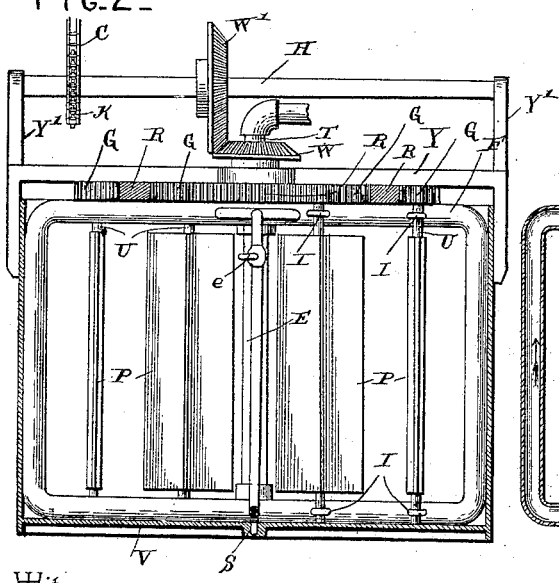
Figure 3:
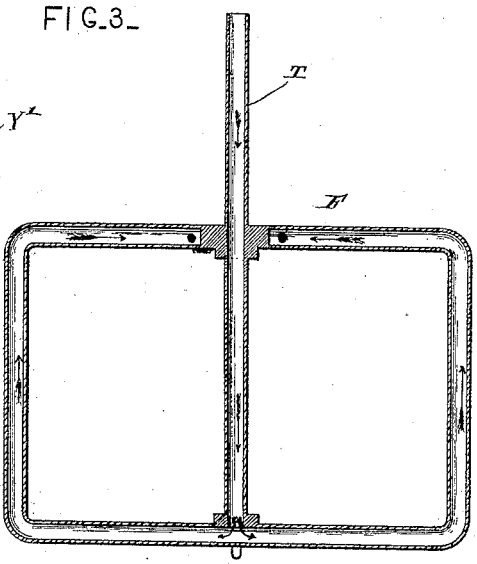

Figure 1 is a plan view of this improved machine. Fig. 2 is a vertical transverse section on the line 2 2 of Fig. 1, looking in the direction of the arrow. Fig. 3 is a vertical section of the stirrer-frame, showing the course which the steam takes through the same.

Referring to the said drawings, the letter V designates a vessel, across which is located a yoke Y, below the center of which yoke is secured a ring-shaped gear R—that is to say, a ring having teeth on both its inner and outer faces.

Journaled vertically through the yoke Y and mounted in a step S at the center of the vessel is a tubular shaft T, which carries a tubular frame F, these parts being so connected that when steam is passed down the shaft it travels out the lower arms of the frame, which move in contact with the bottom of the vessel, up the side arms thereof, which move in contact with the sides of the vessel, and inwardly along the upper arms thereof to the exhaust-pipe E, which leads thence downwardly alongside the tubular shaft T and opens into the vessel, a valve *e* being provided therein near the upper end of the exhaust-pipe, as shown.

Journaled in eyes I on the opposite sides of the frame F are four upright shafts U, carrying paddles P, which may be solid, perforated, slotted, or reticulated, as shown in Fig. 2. At the upper end of each shaft U is a gear G, whose teeth mesh with those on the ring-shaped gear R, the outer gears traveling upon the exterior of said ring and the inner upon the interior thereof, as will be understood. Hence when the tubular shaft T is turned and the frame F rotates the sides and bottom of the vessel will be scraped by the frame, and at the same time the several paddles will independently rotate upon their own axes. I have below described the means for turning the shaft T, which forms part of the present invention.

The material to be cooked and stirred is placed within the vessel, and the latter may or may not be heated as over a fire. Steam is then fed into the tubular shaft T, passes down the same, outward along the bottom arms of the frame, up the side arms of the same, inwardly along the upper arms of the same, through the valve *e*, and down the exhaust E into the material, rising therein to the top, where it escapes into the air and is condensed. When the valve *e* is closed, there is of course no circulation through the pipes; but when the circulation is going on it will be obvious that the bottom and side arms of the frame will be highly heated, and when they move against the bottom and sides of the vessel they will cause the separation therefrom of any adherent material. If the substance being cooked requires only stirring and is not so liable to stick to the sides, the steam is of course shut off.

Various changes in the construction and arrangement of parts may be made without departing from the spirit of my invention.

In Fig. 2 is shown the means I preferably employ for driving the tubular shaft T. Y' are upward extensions of the yoke, in which is journaled a horizontal shaft H, and a bevel gear-wheel W, keyed to the tubular shaft T, engages with another bevel gear-wheel W' on the horizontal shaft H. A chain C leads from a suitable source of power over a sprocket-wheel K, also keyed on the shaft H. By this means rotary movement is given the tubular shaft T without the use of a belt, which might become gummed and swollen in the steam.

What is claimed as new is—

1. In a stirring-machine, the combination, with the reception-vessel having a step at the center of its bottom, a yoke across the top of said vessel, and a tubular shaft turning in a bearing in said yoke and resting in said step, of a tubular frame-work leading from the lower end of said shaft outwardly along the bottom of the vessel, upwardly along the sides thereof, and inwardly, and an exhaust connected with the inner ends of the frame and leading thence downwardly alongside the shaft and opening into the vessel, substantially as described.

2. In a stirring-machine, the combination, with the vessel, a yoke across the top thereof, a toothed ring secured to the lower side of said yoke, a tubular shaft turning in a bearing through the yoke at the center of said ring, a tubular frame-work carried by the shaft in contact with the bottom and sides of the vessel, and a valved exhaust leading from said frame downwardly and opening into the vessel, of upright shafts journaled in eyes carried by the frame-work, paddles on said shafts within the frame-work, and gears also on said shafts engaging the teeth on said stationary ring, all as and for the purpose hereinbefore set forth.

3. In a stirring-machine, the combination, with a vessel having a yoke across its open upper end, a tubular steam supply shaft journaled in said yoke, a tubular frame-work leading from the lower end thereof outwardly, upwardly, and thence inwardly, and an exhaust connected to the inner upper end of said frame-work, of upward extensions from said frame-work, a horizontal shaft journaled therein, intermeshing bevel-gears on said horizontal and vertical shafts, and means for rotating the horizontal shaft, as and for the purpose hereinbefore set forth.

4. In a stirring-machine, the ring-shaped gear R, having teeth on the inner and outer faces, the frame F, the upright shafts U, arranged in pairs on opposite sides of the frame, and gears G on the upper end of each shaft, said gears being arranged so that the individual gears of each pair at each side of the frame will engage the inner and outer teeth of the gear R, respectively, as set forth.

In testimony that I claim the foregoing as my own I have hereto affixed my signature in presence of two witnesses.

DANIEL HENRY McCOY.

Witnesses:
JAMES H. O'DONNELL,
JAMES McGAHEY.